United States Patent [19]

Hartmann et al.

[11] 3,911,045

[45] Oct. 7, 1975

[54] PROCESS FOR THE PRODUCTION OF SHAPED STRUCTURES RESISTANT TO HIGH TEMPERATURES

[75] Inventors: Peter Hartmann; Ernst Roos, both of Cologne; Erich Esch, Leverkusen; Hermann Fries, Schildgen; Günter Hentze, Odenthal-Hahnenberg, all of Germany

[73] Assignee: Bayer Aktiengesellschaft, Leverkusen, Germany

[22] Filed: Feb. 11, 1974

[21] Appl. No.: 440,977

[30] Foreign Application Priority Data

Feb. 9, 1973  Germany............................ 2306463

[52] U.S. Cl....... 260/826; 260/31.2 T; 260/32.8 SB; 260/33.4 SB; 260/33.6 SB; 260/38; 260/37 SB; 260/827; 260/838; 260/845
[51] Int. Cl.²................... C08L 61/04; C08L 83/06
[58] Field of Search..................................... 260/826

[56] References Cited

UNITED STATES PATENTS

| | | | |
|---|---|---|---|
| 2,884,388 | 4/1959 | Hedlund............................. | 260/826 |
| 2,920,058 | 1/1960 | Brown................................ | 260/826 |
| 3,477,984 | 11/1969 | Bahnsen............................. | 260/826 |

FOREIGN PATENTS OR APPLICATIONS

| | | | |
|---|---|---|---|
| 681,919 | 3/1964 | Canada.............................. | 260/826 |

*Primary Examiner*—Wilbert J. Briggs, Sr.
*Attorney, Agent, or Firm*—Connolly and Hutz

[57] ABSTRACT

The invention relates to a process for the production of shaped articles resistant to high temperatures which are obtained by mixing a phenol-formaldehyde and/or cresol-formaldehyde resin with a polysiloxane resin optionally in the presence of compounds which split off formaldehyde and fillers. The resulting mixture is then cured by heating. The premature decomposition of the formaldehyde resins when heated will be avoided by said procedure.

10 Claims, No Drawings

PROCESS FOR THE PRODUCTION OF SHAPED STRUCTURES RESISTANT TO HIGH TEMPERATURES

For some time now, phenol has been processed with formaldehyde to form phenol-formaldehyde resins. These products are used inter alia in the manufacture of friction linings where their object is to cement various different fillers and additives and to enable the forming compositions to be cured by heating.

It has been found that phenol-formaldehyde and/or cresol-formaldehyde resins decompose at temperatures below the maximum working temperature in high-temperature-resistant shaped structures such as friction linings for example.

In the context of this invention, high temperatures are temperatures in the range of from 400° to 600°C. Thermogravimetric examination of a resin of this kind shows that decomposition begins at temperatures around 400°C and produces a weight loss of around 50 % at temperatures up to 800°C. The volatile cracking products can be identified by gas chromatography. In addition to benzene, toluene and xylene, there products include in particular phenol, cresol and xylmol. In conjunction with iron compounds, these products drastically reduce friction values, for example in friction linings.

In addition, it is known from U.S. Pat. No. 2,718,507 that phenol-formaldehyde resins soluble in organic solvents can be co-condensed with organosilicones to form lacquers which are distinguished by their outstanding weather resistance.

The object of the invention is to prevent the decomposition of phenol-formaldehyde and/or cresol-formaldehyde resins at high temperatures.

It has been found that the resistance of moulding compositions based on phenol/formaldehyde resins to high temperatures can be considerably improved by the addition of polysiloxanes.

Accordingly, the invention provides a process for the production of a shaped structure resistant to high temperatures which process is characterised by the fact that a phenol- and/or cresol-formaldehyde resin is mixed with a polysiloxane resin optionally in the presence of a formaldehyde donor and optionally in the presence of an organic and/or inorganic filler, and the mixture is cured by heating, optionally under pressure, to form a shaped structure.

Suitable phenol- and/or cresol-formaldehyde resins are resins obtained in conventional manner by reacting phenol and/or cresol with an aqueous formaldehyde solution in a molar ratio of 1 : 0.6 to 1 : 1.4 in the presence of an acidic or basic catalyst. It is preferred to use novolaks obtained by condensing phenols and aqueous formaldehyde solutions in a ratio of 1 : 0.7 to 1 : 1 in the presence of an acid catalyst, such as oxalic acid for example, separating off the resin phpse, drying by distilling off the water and subsequently grinding the residual resin (cf. for example Ullmanns Encyclopadie der technischen Chemie, Vol. 13, page 459, Verlag: Urban & Schwarzenberg, Munich-Berlin, 1962).

Suitable polysiloxane resins are polymers with the following units:

$R\,SiO_{3/2}$ in a molar percentage of 70 to 98 %, preferably 80 to 95 %

$R_2SiO_{2/2}$ in a molar percentage of 2 to 20 %, preferably 5 to 15 %

$C_6H_5SiO_{3/2}$ in a molar percentage of 0 to 10 %, preferably from 2.5 to 5 %

$R_3\,SiO_{1/2}$ in a molar percentage of 0 to 5 %, preferably 1 to 2 %

The radical R represents a hydrocarbon chain with one to four carbon atoms such as methyl, ethyl, propyl and/or butyl. The molar percentages quoted for the units of the polysiloxanes together total 100 %. To a very limited extent the polysiloxane resins contain terminal groups which contain both OH and also OR-radicals. A 51 % solution of the siloxane resin in xylene has a viscosity of from 5 to 100 centistokes, as measured at 20°C.

The polysiloxane resins can be produced in accordance with methods described in the literature by controlled hydrolysis of the following monomers:

$R—Si—X_3$;
$R_2—Si—X_2$;
$C_6H_5—Si—X_3$; and
$R_3—Si—X$ in the required composition shown above, X representing chlorine and/or alkyl O—-alkyl having one to four carbon atoms, optionally in the presence of an organic solvent for example, toluene, xylene, methanol, ethanol or butanol and optionally in the presence of an alkali or acid (cf. for example W. Noll, Chemie und Technologie der Silicone. Verlag Chemie GmbH, Weinheim/Bergstr. 1968, pages 162 – 171).

The polysiloxane resins used are present in the polymer mixture in quantities of from 10 to 70 % by weight and preferably in quantities of from 20 to 50 % by weight.

The resin mixtures used for producing the high-temperature-resistant shaped structures are obtained by intimately mixing a phenol-and/or cresol-formaldehyde resin with a polysiloxane at a temperature at which the resin components are not cured (generally at temperatures below 70°C), optionally in the presence of one or more organic solvents such as benzene, toluene, xylene, methanol, ethanol, butanol, ethyl acetate and acetone, until complete admixture has occurred. Mixing is preferably carried out in the presence of one of the aforementioned solvents or in a mixture of solvents. Mixing can be carried out by the usual methods, for example by means of a stirrer, a drum mixer or internal mixer. The resulting mixture is cured at a temperature of from 150° to 450°C, preferably from 250° to 400°C, optionally under pressure, the intensity of the pressure being variable in accordance with the curing temperature of the solvent used and the required properties of the shaped structure.

Examples of suitable inorganic or organic fillers include metals and/or metal oxides, calcium fluorite, asbestors, silica, butyl, nitrile and/or chlorprene rubbers.

Although not absolutely essential, it is of course possible to add a formaldehyde donor, for example, hexamethyle tetramine, trioxy or polyoxymethylene for curing the shaped structures.

The following Table I demonstrates the superior thermal properties of the shaped structures obtained. The Table contains data on the weight loss of 5 sample resins as determined by thermogravimetry under nitrogen.

Resin 1:
is a phenol/formaldehyde resin consisting of 89 % by weight of novolak, obtained in conventional manner by reacting phenol with formaldehyde in a molar ratio of 1 : 0.8, 10 % by weight of hexamethylene tetratriamine and 1% by weight of phthalic acid anhydride, cured by heating for 1 hour at 250°C.

Resin 2:

is a methyl silicone resin containing 3 mol % of phenyl siloxane in the form of a 51 % by weight solution in xylene with a viscosity of 40 to 60 c St, as measured at 20°C. The resin was cured by heating for 3 hours to 350°C.

Mixtures of Resin 1 and Resin 2:

Resin 3:

consists of 80 % by weight of Resin 1 and of 20 % by weight of Resin 2 (based on solids content) in the form of a 51 % solution in xylene. The resins were intimately mixed for 5 minutes at room temperature with an Ultra-Turrax stirrer (manufactured by Messrs. Janke and Kunkel KG), and the mixture obtained cured for 3 hours at 350°C.

Resin 4:

consists of 60 % by weight of Resin 1 and of 33 % by weight of Resin 2 (based on solids). Mixing and curing are carried out in the same way as for Resin 3.

Resin 5:

consists of 50 % by weight of Resin 1 and of 50 % by weight of Resin 2 (based on solids). Mixing and curing are carried out in the same way as for Resin 3.

Table 1

Thermogravimetric analysis of sample resins under nitrogen at 760 Torr
Temperature rate 20°C Min$^{-1}$

| Temperature °C | Resin 1 weight loss % | Resin 2 weight loss % | Mixtures of Resin 1 and Resin 2 | | |
|---|---|---|---|---|---|
| | | | a) (4 : 1) weight loss % | b) (2 : 1) weight loss % | c) (1 : 1) weight loss % |
| 100 | 0.5 | 0.0 | 1.0 | 0.0 | 1.0 |
| 150 | 1.5 | 0.0 | 1.0 | 0.0 | 1.0 |
| 200 | 2.0 | 0.0 | 1.0 | 0.0 | 1.0 |
| 250 | 3.5 | 0.0 | 1.0 | 0.0 | 1.0 |
| 300 | 4.5 | 0.0 | 1.5 | 0.0 | 1.0 |
| 350 | 5.0 | 0.5 | 1.5 | 0.0 | 1.0 |
| 400 | 6.5 | 1.0 | 1.5 | 0.5 | 1.5 |
| 450 | 10.0 | 1.5 | 2.0 | 1.0 | 1.5 |
| 500 | 15.0 | 2.5 | 3.5 | 2.5 | 2.0 |
| 550 | 22.5 | 3.0 | 6.0 | 5.0 | 3.5 |
| 600 | 31.0 | 4.0 | 10.0 | 6.5 | 6.0 |
| 650 | 35.5 | 6.0 | 14.0 | 8.5 | 9.0 |
| 700 | 40.0 | 7.0 | 17.0 | 10.0 | 11.5 |
| 750 | 42.0 | 7.5 | 20.0 | 11.5 | 13.5 |
| 800 | 44.5 | 9.5 | 22.0 | 12.5 | 16.0 |

As shown in Table 1, the phenol-formaldehyde resin 1 reaches a weight loss of 10 % at 450°C and the polymethyl siloxane resin 2 the same weight loss at temperatures above 800°C. The effect of adding 20 % of the resin to resin 1 is that resin 3 can be heated to a temperature of 600°C before undergoing the same weight loss. With an addition of 33 %, the corresponding value is even higher at 700°C, whilst a further increase in the addition to 50% produces slightly inferior thermostability. Accordingly, the optimum value is reached with a mixing ratio of 2 : 1 parts of phenol-formaldehyde to polymethyl siloxane resin.

The effect obtained is synergistic, in other words it is considerably greater than the effect calculated by addition from the values of the individual components.

This behaviour is confirmed by the weight loss of the resin at 800°C. At temperatures of this order, the weight loss of the phenol-formaldehyde resin is 44.5 %, whilst the weight loss of the pure polymethyl siloxane resin is 9.5 %. Of the synergistic mixtures, resin 4 with a weight loss of only 12.5 % again almost reaches the value of silicone resin 2. Accordingly, the unsatisfactory high-temperature behavior or phenol-formaldehyde resins is improved to the level of silicone resins by relatively small additions of polymethyl siloxane resin.

A test specimen produced from the optimum resin mixture shows good mechanical strength at temperatures above 400°C. Its strength is greater than that of test specimen of pure silicone resin, and is of the same order as that of phenol-formaldehyde resins.

In addition, the synergistic resin mixtures described above ae considerably less expensive than silicone resins.

By virtue of their outstanding high-temperature properties, the phenol-formaldehyde-polyalklyl siloxane resin mixtures produced in accordance with the invention can be used for the production of shaped structures exposed to high temperatures such as friction linings, for example for clutches and brakes.

We claim:

1. A process for producing a shaped structure which is resistant to high temperature which comprises mixing (a) phenol-formaldehyde resin, cresol-formaldehyde resin or a mixture thereof with (b) a polysiloxane resin consisting of 70 to 98 molar % of $RSiO_{3/2}$ units, 2 to 20 molar % of $R_2SiO_{2/2}$ units, 0 to 10 molar % $C_6H_5SiO_{3/2}$ units and 0 to 5 molar % $R_3SiO_{1/2}$ units wherein R is a hydrocarbon chain having one to four carbon atoms and curing said mixture by heating it at an elevated temperature to thereby form said shaped structure, the resin of (a) being formed by reacting phenol, cresol or a mixture thereof with aqueous formaldehyde in a molar ratio of 1:0.6 to 1:1.4 and there being from 10 to 70% by weight of (a) based on the weight of (a) plus (b).

2. The process of claim 1 wherein said mixture is cured at a temperature of from 150° to 450°C.

3. The process of claim 1 wherein said mixture is cured at a temperature of from 250° to 400°C.

4. The process of claim 1 wherein (a) and (b) are mixed in the presence of an organic solvent.

5. The process of claim 4 wherein said organic solvent is benzene, toluene, xylene, methanol, ethanol, butanol, ethyl acetate, acetone or a mixture thereof.

6. The process of claim 1 wherein a filler is included in said mixture which is cured.

7. The process of claim 1 wherein said curing is carried out under pressure.

8. The process of claim 1 wherein (b) consists of 80 to 95 molar % of $RSiO_{3/2}$ units, 2 to 20 molar % of $R_2SiO_{2/2}$ units, 2.5 to 5 molar % of $C_6H_5SiO_{3/2}$ units and 1 to 2 molar % of $R_3SiO_{1/2}$ units.

9. The process of claim 1 wherein the mixture of (a) is formed by reacting phenol, cresol or a mixture thereof with aqueous formaldehyde in a molar ratio of 1:0.7 to 1:1.

10. The product produced by the process of claim 1.

* * * * *